United States Patent
Kawabuchi et al.

(10) Patent No.: US 8,305,085 B2
(45) Date of Patent: Nov. 6, 2012

(54) LITHIUM-ION BATTERY CONTROLLING APPARATUS AND ELECTRIC VEHICLE

(75) Inventors: Yuuji Kawabuchi, Wako (JP); Naoki Maruno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/249,860

(22) Filed: Sep. 30, 2011

(65) Prior Publication Data

US 2012/0086368 A1 Apr. 12, 2012

(30) Foreign Application Priority Data

Oct. 12, 2010 (JP) ................................. 2010-229978

(51) Int. Cl.
*G01N 27/416* (2006.01)
*H02J 7/00* (2006.01)

(52) U.S. Cl. ......... 324/433; 320/132; 320/133; 320/134

(58) Field of Classification Search .................... 324/433
See application file for complete search history.

(56) References Cited

U.S. PATENT DOCUMENTS

| | | | |
|---|---|---|---|
| 5,578,915 A | 11/1996 | Crouch, Jr. et al. | |
| 6,008,626 A * | 12/1999 | Sato et al. | 320/132 |
| 6,424,157 B1 * | 7/2002 | Gollomp et al. | 324/430 |
| 2001/0015636 A1 * | 8/2001 | Yagi et al. | 320/132 |
| 2001/0028238 A1 * | 10/2001 | Nakamura et al. | 320/132 |
| 2003/0067282 A1 * | 4/2003 | Arai et al. | 320/132 |
| 2005/0017687 A1 * | 1/2005 | Nagaoka | 320/132 |

FOREIGN PATENT DOCUMENTS

| | | |
|---|---|---|
| JP | 2000-30753 | 1/2000 |
| JP | 2000-270491 | 9/2000 |
| JP | 2001-339864 | 12/2001 |
| WO | WO 03/041240 | 5/2003 |

OTHER PUBLICATIONS

Japanese Office Action for corresponding JP Application No. 2010-229978, Jul. 17, 2012.

* cited by examiner

*Primary Examiner* — Yalkew Fantu
(74) *Attorney, Agent, or Firm* — Ditthavong Mori & Steiner, P.C.

(57) ABSTRACT

A lithium-ion battery controlling apparatus includes a controller. The controller is configured to raise an upper-limit voltage in response to capacity degradation of a lithium-ion battery which is configured to supply power to a load and receive power from the load.

10 Claims, 6 Drawing Sheets

LITHIUM-ION BATTERY CONTROLLING APPARATUS AND ELECTRIC VEHICLE

CROSS-REFERENCE TO RELATED APPLICATIONS

The present application claims priority under 35 U.S.C. §119 to Japanese Patent Application No. 2010-229978, filed Oct. 12, 2010, entitled "Lithium-ion battery controlling apparatus". The contents of this application are incorporated herein by reference in their entirety.

BACKGROUND OF THE INVENTION

1. Field of the Invention

The present invention relates to a lithium-ion battery controlling apparatus and an electric vehicle.

2. Discussion of the Background

Electric vehicles (EVs) and hybrid electric vehicles (HEVs) are equipped with a capacitor that supplies power to a motor. The capacitor includes a plurality of rechargeable batteries.

Japanese Unexamined Patent Application Publication No. 2001-339864 discloses a technique in which a usable range of state of charge (SOC) is increased when a lead-acid battery degrades.

In recent years, lithium-ion batteries have attracted attention as rechargeable batteries. Because of the lightweight nature and high energy density performance, lithium-ion batteries are expected to be favorably used as a vehicle-mounted high-output power source.

SUMMARY OF THE INVENTION

According to one aspect of the present invention, a lithium-ion battery controlling apparatus includes a controller. The controller is configured to raise an upper-limit voltage in response to capacity degradation of a lithium-ion battery which is configured to supply power to a load and receive power from the load.

According to another aspect of the present invention, a lithium-ion battery controlling apparatus includes a controller. The controller is configured to raise an upper-limit voltage of a lithium-ion battery by increasing a potential of a positive electrode of the lithium-ion battery in response to capacity degradation occurring at a negative electrode of the lithium-ion battery.

According to further aspect of the present invention, an electric vehicle includes a motor, a lithium-ion battery, a degradation detector and a controller. The lithium-ion battery is configured to supply power to the motor and receive power from the motor. The degradation detector is configured to detect or estimate a degree of degradation of the lithium-ion battery. The controller is configured to raise an upper-limit voltage of the lithium-ion battery during regeneration in accordance with the degree of degradation of the lithium-ion battery.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
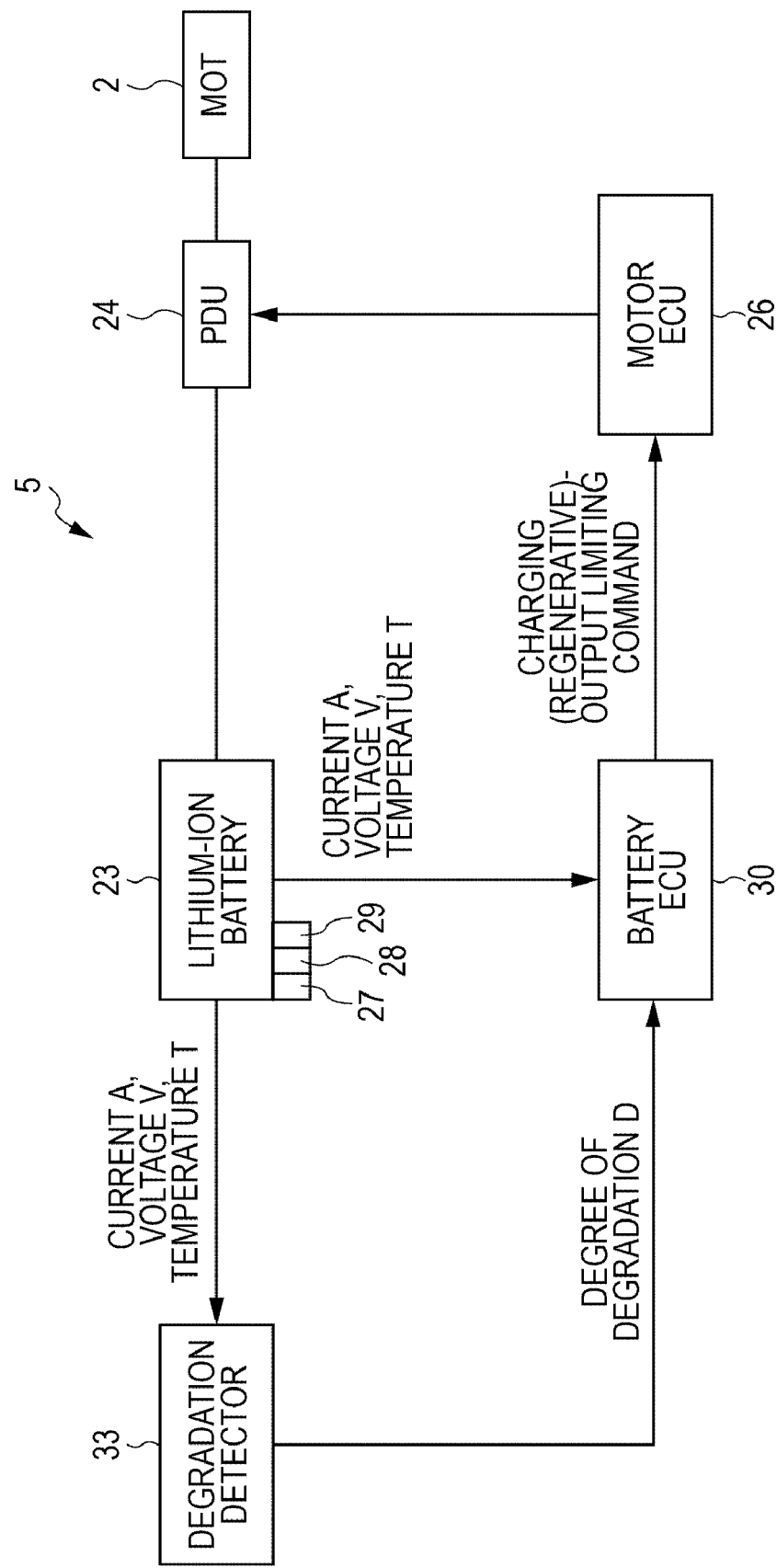
FIG. 1 is a schematic block diagram illustrating a configuration of a power system controlled by a lithium-ion battery controlling apparatus according to an embodiment of the present invention.

A lithium-ion battery controlling apparatus according to the embodiment of the present invention includes a controller (e.g., a motor electronic control unit (ECU) 26 and a battery ECU 30 of the following embodiment) configured to raise an upper-limit voltage in response to capacity degradation of a lithium-ion battery (e.g., a battery 23 of the following embodiment) which is configured to supply power to a load (e.g., a motor-generator 2 of the following embodiment) and receive power from the load.

According to this embodiment, the usable range of SOC can be ensured by raising the upper-limit voltage.

A lithium-ion battery controlling apparatus according to the embodiment of the present invention includes a controller (e.g., the motor ECU 26 and the battery ECU 30 of the following embodiment) configured to raise an upper-limit voltage of a lithium-ion battery (e.g., the battery 23 of the following embodiment) by increasing a potential of a positive electrode of the lithium-ion battery in response to capacity degradation occurring at a negative electrode of the lithium-ion battery.

According to this embodiment, the usable range of SOC can be ensured by raising the upper-limit voltage.

In the lithium-ion battery controlling apparatus according to the embodiment, the controller may be configured to estimate a degradation state at or below a temperature at which mobility of an electrolyte of the lithium-ion battery is lowered.

According to this embodiment, since a voltage drop caused by lithium deposition is significant in a low-temperature state, the usable range of SOC can be ensured by varying the amount of correction in accordance with the temperature and the upper-limit open circuit voltage corresponding to changes in the amount of electricity.

In the lithium-ion battery controlling apparatus according to the embodiment, the controller may raise the upper-limit voltage at or below 0 degrees Celsius (0° C.).

According to this embodiment, since the amount of lithium electrodeposition is large and the usable range of SOC decreases at or below 0° C. where the electrolyte is inactive, it is effective to raise the upper-limit voltage at or below 0° C.

In the lithium-ion battery controlling apparatus according to the embodiment, the controller may raise the upper-limit voltage when a lithium electrodeposition voltage is less than or equal to an upper-limit open circuit voltage (OCV).

According to this embodiment, if the lithium electrodeposition voltage is higher than the upper-limit open circuit voltage, there is no need to raise the upper-limit voltage, and the degradation can be suppressed by stopping the correction when the upper limit of the battery voltage is reached.

In the lithium-ion battery controlling apparatus according to the embodiment, the controller may be configured to determine occurrence of the capacity degradation of the lithium-ion battery by detecting an internal resistance of the lithium-ion battery.

According to this embodiment, since the internal resistance increases as the battery degrades, the occurrence of capacity degradation of the lithium-ion battery can be easily determined by detecting the internal resistance.

In the lithium-ion battery controlling apparatus according to the embodiment, the load may be a motor (e.g., the motor-generator 2 of the following embodiment), and the controller may be configured to calculate the upper-limit voltage in accordance with the capacity degradation, to compare a voltage of the lithium-ion battery (e.g., an upper-limit open circuit voltage of the following embodiment) with the upper-limit voltage, and to give a charging-output limiting command in accordance with a result of the comparison.

According to this embodiment, it is possible to properly manage the charging output.

In the lithium-ion battery controlling apparatus according to the embodiment, the lithium-ion battery may be a battery for vehicles.

According to this embodiment, where the lithium-ion battery is used as a battery for vehicles, since a control operation other than vehicle running control (e.g., a refresh operation) cannot be freely performed, the usable range of SOC can be ensured by raising the upper-limit voltage regardless of the degree of battery degradation.

An electric vehicle according to the embodiment of the present invention includes a motor, a lithium-ion battery configured to supply and receive power to and from the motor, a degradation detector configured to detect or estimate a degree of degradation of the lithium-ion battery, and the controller configured to raise an upper-limit voltage of the lithium-ion battery during regeneration in accordance with the degree of degradation of the lithium-ion battery.

According to this embodiment, the usable range of SOC can be ensured by raising the upper-limit voltage.

The embodiments will now be described with reference to the accompanying drawings, wherein like reference numerals designate corresponding or identical elements throughout the various drawings.

FIG. 1 is a schematic block diagram illustrating a configuration of a power system controlled by a lithium-ion battery controlling apparatus for a lithium-ion secondary battery (hereinafter referred to as a lithium-ion battery) according to the embodiment of the present invention. The lithium-ion battery controlling apparatus is particularly used for vehicles, such as electric vehicles and hybrid electric vehicles.

Referring to FIG. 1, in a power system 5, a motor-generator 2 serving as a load is connected through a power drive circuit (hereinafter referred to as a PDU) 24 to a battery 23 serving as a power source for the motor-generator (MOT) 2. Power (i.e., power for powering the motor and regenerative power for regenerative operation) can be supplied and received between the motor-generator 2 and the battery 23 through the PDU 24.

The battery 23 is a lithium-ion battery. When, for example, lithium cobalt oxide serves as the positive electrode of the lithium-ion battery, the fundamental charge-discharge reaction is as follows.

Positive Electrode Reaction:

  (1)

Negative Electrode Reaction:

  (2)

Overall Battery Reaction:

  (3)

During discharging of the battery 23, in the electrode reaction at the negative electrode, lithium atoms Li are converted into lithium ions $Li^+$ by ejection of electrons $e^-$ and ejected into the electrolyte in the separator. In the electrode reaction at the positive electrode, lithium ions $Li^+$ in the electrolyte are taken in and absorb electrons $e^-$. Thus, lithium atoms Li are taken into the positive electrode. During charging of the battery 23, lithium ions $Li^+$ in the electrolyte are taken in the electrode reaction at the negative electrode, and lithium ions $Li^+$ are ejected into the electrolyte in the electrode reaction at the positive electrode.

To detect the operating state of the motor-generator 2, the motor-generator 2 includes a sensor, such as a rotational speed sensor, that detects the rotational speed of the motor-generator 2. To control the operation of the motor-generator 2, a motor controller (hereinafter referred to as a motor ECU) 26 constituted by an electronic circuit including a central processing unit (CPU) is provided. An output signal from the rotational speed sensor is input to the motor ECU 26. In accordance with the output signal (input data) from the rotational speed sensor and predetermined processing, the motor ECU 26 controls the power generation and driving of the motor-generator 2, through the PDU 24, in response to a requested operation.

The battery 23 includes a voltage sensor 27 and a current sensor 28 that detect a voltage V and a current A, respectively, between terminals of the battery 23. The battery 23 also includes a temperature sensor 29 that detects a temperature T of the battery 23. To monitor the state of the battery 23, a battery controller (hereinafter referred to as a battery ECU) 30 constituted by an electronic circuit including a CPU is provided. A degradation detector 33 that detects a degree of degradation D of the battery 23 is also provided. Output signals from the voltage sensor 27, the current sensor 28, and the temperature sensor 29 are input to the battery ECU 30 and the degradation detector 33. In accordance with the output signal (input data) from each sensor and processing determined in advance from the degree of degradation D, the battery ECU 30 calculates the remaining capacity (state of charge (SOC)) of the battery 23 and performs degradation determination processing related to the life of the battery 23.

The motor ECU 26 and the battery ECU 30 are connected to each other through a bus. Detection data obtained from each of the sensors 27 to 29 and data generated in control processing can be transmitted and received between the motor ECU 26 and the battery ECU 30. The motor ECU 26 and the battery ECU 30 constitute the controller of the lithium-ion battery controlling apparatus.

Figure 2:
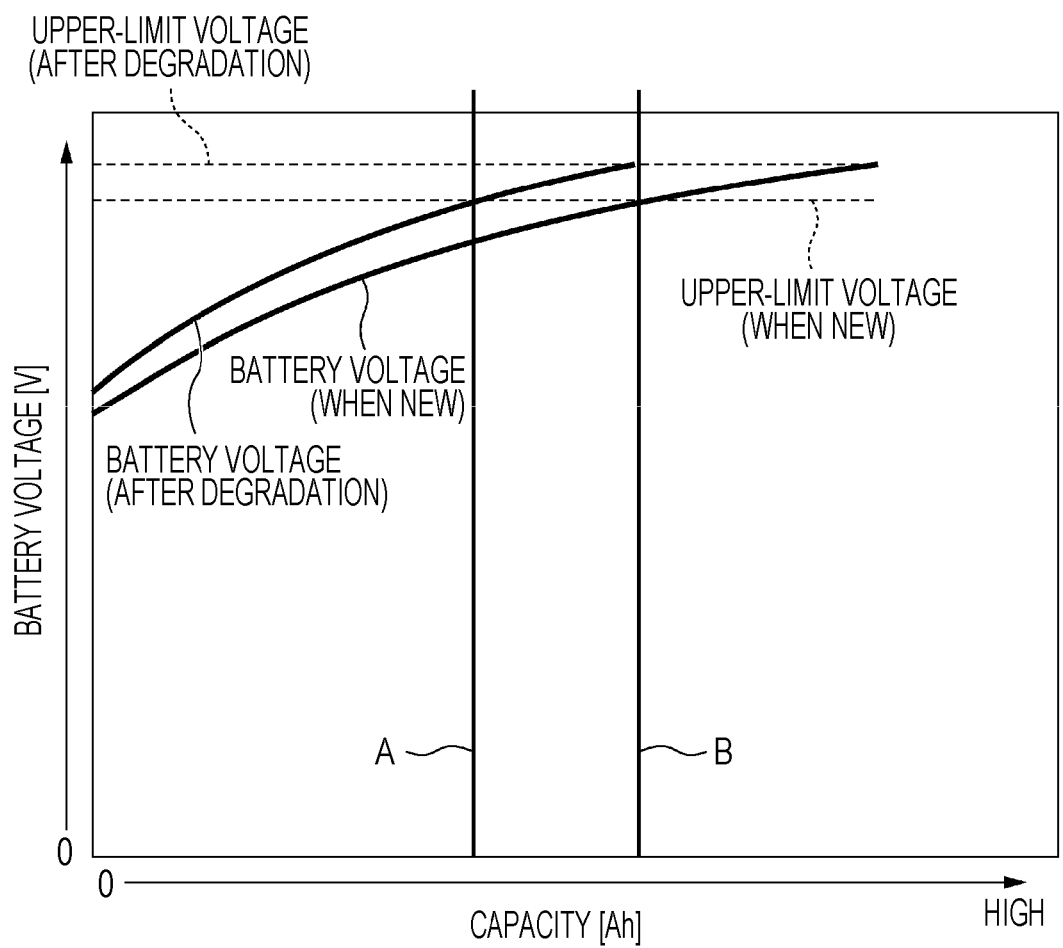
FIG. 2 is a graph showing a relationship between battery voltage and battery capacity during constant-current charging.

The degradation detector 33 calculates an internal resistance of the battery 23. From the internal resistance, the degradation detector 33 calculates the life of the battery 23 and determines the degradation level or the degree of degradation D of the battery 23. When the battery 23 degrades, as shown in FIG. 2, it reduces its capacity at the same battery voltage. Therefore, if the battery 23 is charged at a voltage not exceeding the same upper-limit voltage, the charging capacity of the battery 23 is lower than that the battery 23 had when it was new.

The battery ECU 30 determines the degradation state of the battery 23 in accordance with the degree of degradation D output from the degradation detector 33. If the degree of degradation D exceeds a predetermined value, the battery ECU 30 raises the upper-limit voltage to increase the usable range of the charging (regenerative) voltage. Then, the battery ECU 30 outputs a charging (regenerative)-output limiting value to the motor ECU 26 as a command value.

Figure 3:
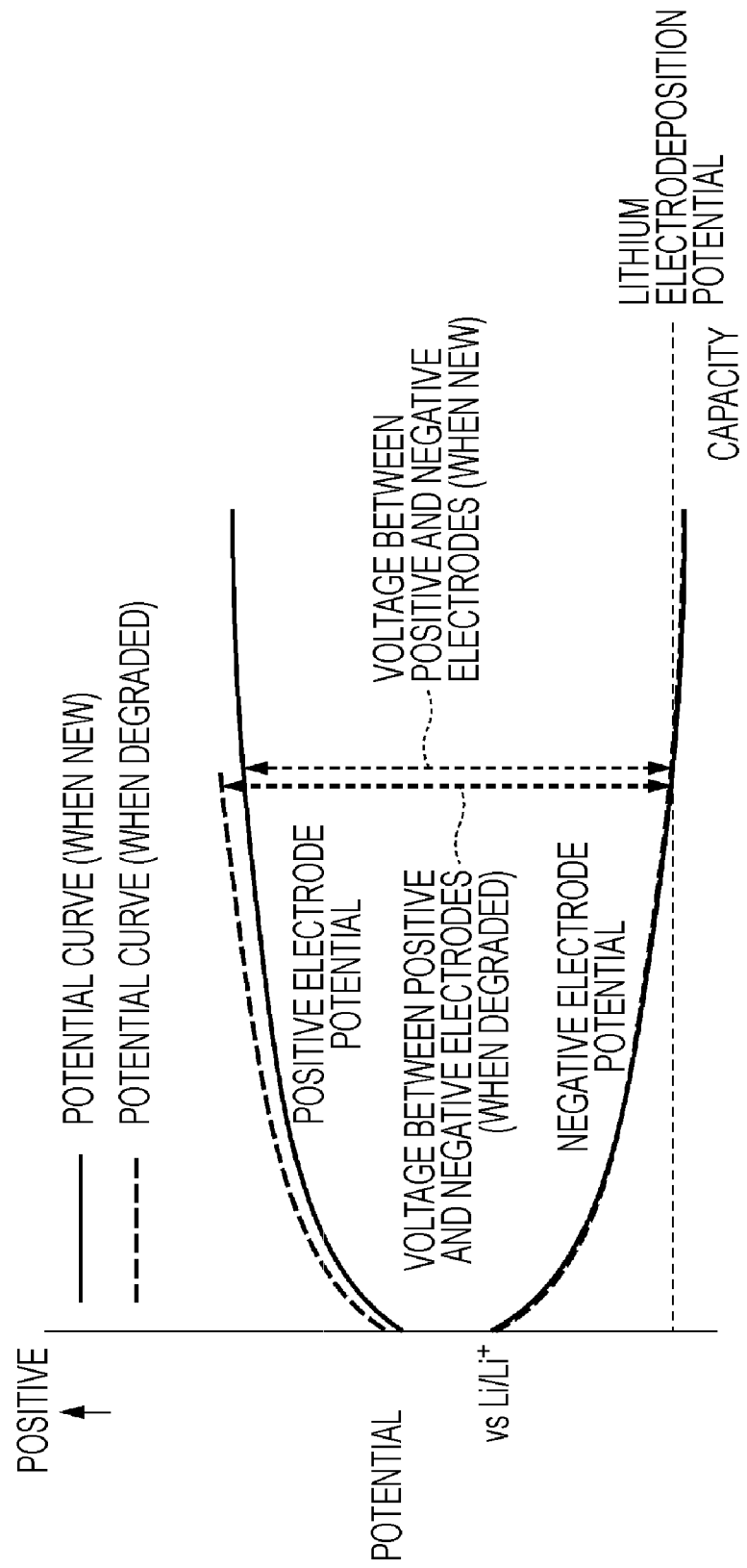
FIG. 3 is a graph showing a relationship between positive and negative electrode potentials and battery capacity during constant-current charging.

In the related art, a lithium-ion battery needs to be used in the range of potential where lithium is not electrodeposited on the negative electrode. Therefore, the upper-limit voltage is limited to a voltage between the positive and negative electrodes which realizes the range of potential where lithium is not electrodeposited on the negative electrode. However, a study done by the present inventors revealed, as shown in FIG. 3, that the positive electrode potential in the range of potential where lithium is not electrodeposited on the negative electrode increases when the battery degrades. Therefore, when the battery 23 degrades, it is possible to increase the usable voltage between the positive and negative electrodes. Referring to FIG. 2, during charging (regeneration), only a capacity A can be used at the upper-limit voltage equal to that for a new battery, whereas the usable range can be increased to a capacity B by raising the upper-limit voltage to a level for a degraded battery. Thus by increasing the usable range of SOC, it is possible to improve fuel efficiency.

Figure 4:
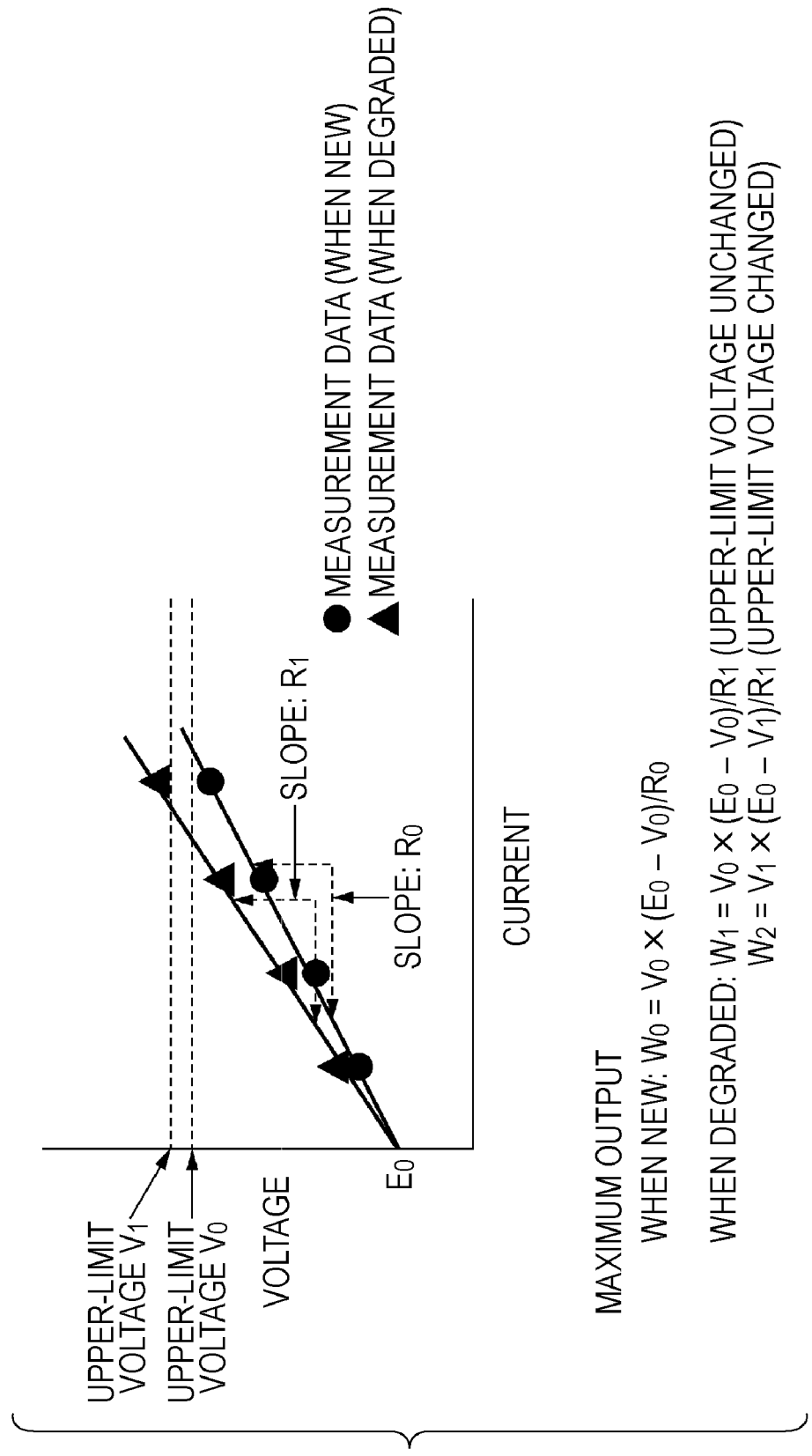
FIG. 4 is a graph for calculating regenerative output of a battery when new and degraded.

When an approximate straight line is obtained by performing constant-current charging/discharging at a predetermined voltage while varying the level of current, the maximum regenerative output of the battery can be expressed as $V=E_0-I \times R$, where R is an internal resistance corresponding to the slope of the approximate straight line and $E_0$ is an initial open circuit voltage corresponding to the Y intercept of the approximate straight line. The resulting $E_0$ and R are used to calculate the output values up to the upper-limit voltage. The maximum output (W) can be expressed as W="upper-limit voltage"$\times(E_0-$"upper-limit voltage")/R. Referring to FIG. 4, when the upper-limit voltage is fixed, the output produced when the battery is new, $W_0=V_0 \times (E_0-V_0)/R_0$, is reduced to $W_1=V_0 \times (E_0-V_0)/R_1$ after degradation of the battery. However, when the upper-limit voltage is raised in response to degradation of the battery, the output of the battery can be improved to $W_2=V_1 \times (E_0-V_1)/R_1$. This can extend the performance life of the battery and increase the possible travel distance of the vehicle.

Figure 5:
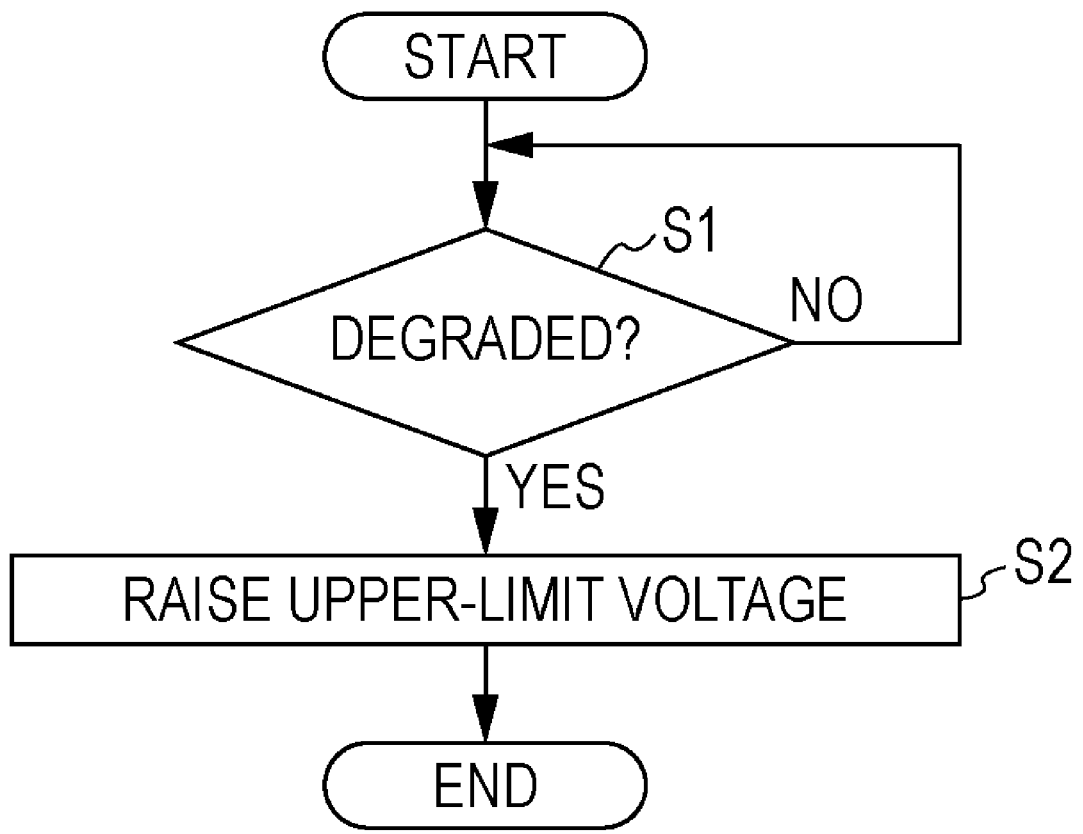
FIG. 5 is a flowchart illustrating a control flow.

FIG. 5 is a flowchart illustrating a control flow of the lithium-ion battery controlling apparatus. First, the battery ECU 30 determines whether degradation occurs (step S1) depending on whether the degree of degradation D exceeds a predetermined value. If the degree of degradation D does not exceed the predetermined value, the battery ECU 30 determines that degradation does not occur (NO in step S1). The battery ECU 30 then makes a determination again as to whether degradation occurs (step S1). If the degree of degradation D exceeds the predetermined value, the battery ECU 30 determines that degradation occurs (YES in step S1). The battery ECU 30 then sends an output command to the motor ECU 26 to raise the upper-limit voltage of the battery 23 (step S2).

Figure 6:
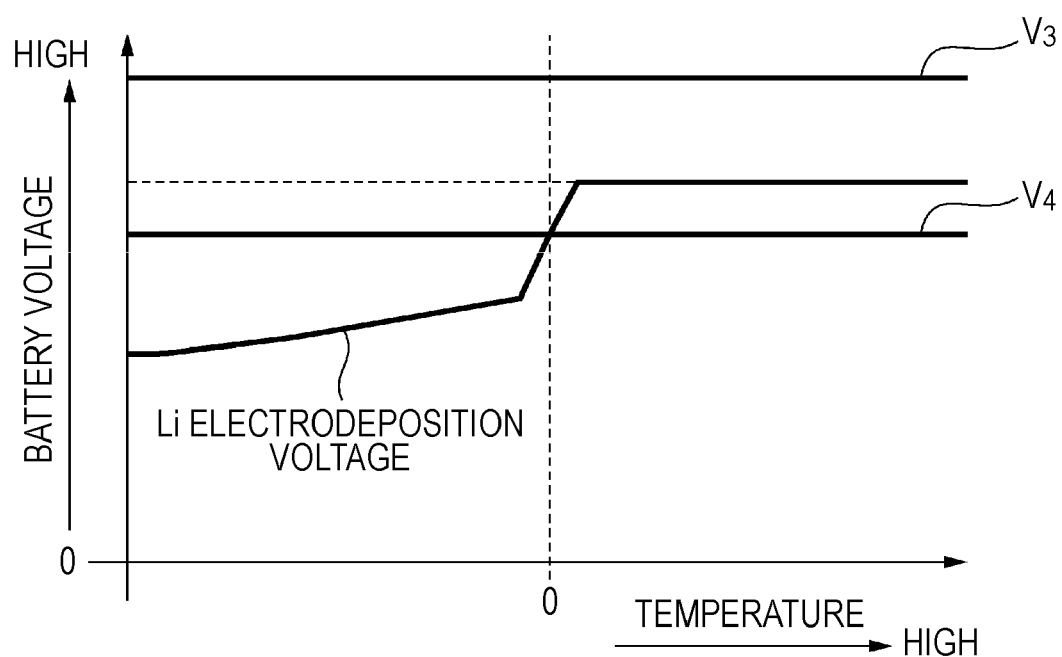
FIG. 6 is a graph showing temperature dependence of a lithium (Li) electrodeposition voltage.

The lithium electrodeposition depends on the battery, or more specifically on the temperature of the electrolyte. FIG. 6 is a graph showing temperature dependence of a lithium electrodeposition voltage. As shown in FIG. 6, the lithium electrodeposition voltage of a lithium-ion battery drops significantly at temperatures below 0° C. where mobility of the electrolyte is lowered. Therefore, if the battery temperature is 0° C. or below, it is possible to increase the usable range of SOC by performing control to raise the upper-limit voltage. Note that the temperature of 0° C. is merely an example. The temperature at which the upper-limit voltage is to be raised can be selected appropriately depending on the type of electrolyte etc.

In view of temperature dependence of the lithium electrodeposition voltage, an open circuit voltage and the lithium electrodeposition voltage at the temperature may be compared. Then, only when the open circuit voltage is higher than or equal to the lithium electrodeposition voltage, the upper-limit voltage may be raised to increase the usable range of SOC.

For example, if the open circuit voltage is $V_3$, the upper-limit voltage is raised because the open circuit voltage is always higher than the lithium electrodeposition voltage. If the open circuit voltage is $V_4$, the upper-limit voltage is raised when the temperature is 0° C. or below because the open circuit voltage is higher than or equal to the lithium electrodeposition voltage, whereas the upper-limit voltage is kept unchanged when the temperature is higher than 0° C. because the open circuit voltage is lower than the lithium electrodeposition voltage.

As described above, in the present embodiment, the usable range of SOC can be ensured by raising the upper-limit voltage in response to capacity degradation of the lithium-ion battery. Specifically, the positive electrode potential in the range of potential where lithium is not electrodeposited on the negative electrode is found to increase when the battery degrades. The usable range of SOC decreases if the battery is used with the capacity kept low. However, the usable range of SOC can be ensured by raising the upper-limit voltage.

In the present embodiment, a degradation state is estimated at a temperature where mobility of the electrolyte is lowered, for example at 0° C. or below, and the upper-limit voltage is raised. Thus, even if the temperature is 0° C. or below where the electrolyte is inactive, it is possible to reduce loss of the usable range of SOC.

In the present embodiment, the upper-limit voltage is raised if the lithium electrodeposition voltage is lower than or equal to the open circuit voltage. Thus, even if degradation occurs during charging and discharging, it is possible to reduce loss of the usable range of SOC. If the lithium electrodeposition voltage is higher than the open circuit voltage, there is no need to raise the upper-limit voltage. In this case, the degradation can be suppressed by stopping the correction when the upper limit of the battery voltage is reached.

In the present embodiment, the occurrence of capacity degradation of the lithium-ion battery can be easily determined by detecting the internal resistance of the lithium-ion battery. Obviously, it is also possible to determine the occurrence of capacity degradation by directly detecting changes in electric capacity in any range of SOC. As shown in FIG. 2, there is a difference in the slope of voltage curve before and after battery degradation. Therefore, there is also a difference in capacity in an SOC range between predetermined values. Generally, a new battery is larger in capacity and the capacity decreases as the battery degrades. This can be used to determine the degradation state.

The present invention is not limited to the embodiments described above and can be changed and modified appropriately.

Obviously, numerous modifications and variations of the present invention are possible in light of the above teachings. It is therefore to be understood that within the scope of the appended claims, the invention may be practiced otherwise than as specifically described herein.

What is claimed is:

1. A lithium-ion battery controlling apparatus comprising:
   a controller configured to raise an upper-limit voltage of a lithium-ion battery by increasing a potential of a positive electrode of the lithium-ion battery in response to capacity degradation occurring at a negative electrode of the lithium-ion battery, wherein the capacity degradation is defined as an increase in internal resistance within the lithium-ion battery over time that results in a reduction in charge storage capacity of the lithium-ion battery when measured by charging the lithium-ion battery at a same charging voltage for a same length of time, and wherein the lithium ion battery is configured to supply power to a load and receive power from the load.

2. The lithium-ion battery controlling apparatus according to claim 1, wherein the controller is configured to estimate a degradation state at or below a temperature at which mobility of an electrolyte of the lithium-ion battery is lowered.

3. The lithium-ion battery controlling apparatus according to claim 2, wherein the controller raises the upper-limit voltage at or below 0° C.

4. The lithium-ion battery controlling apparatus according to claim 2, wherein the controller raises the upper-limit voltage when a lithium electrodeposition voltage is less than or equal to an upper-limit open circuit voltage.

5. The lithium-ion battery controlling apparatus according to claim 1, wherein the controller is configured to determine occurrence of the capacity degradation of the lithium-ion battery by detecting the internal resistance of the lithium-ion battery.

6. The lithium-ion battery controlling apparatus according to claim 1, wherein the load is a motor, and
the controller is configured to calculate the upper-limit voltage in accordance with the capacity degradation, to compare a voltage of the lithium-ion battery with the upper-limit voltage, and to give a charging-output limiting command in accordance with a result of the comparison.

7. The lithium-ion battery controlling apparatus according to claim 6, wherein the lithium-ion battery is a battery for vehicles.

8. An electric vehicle comprising:
a motor;
a lithium-ion battery configured to supply power to the motor and receive power from the motor;
a degradation detector configured to detect or estimate a degree of degradation of the lithium-ion battery; and
an upper-limit voltage controller configured to raise an upper-limit voltage of the lithium-ion battery during regeneration in accordance with the degree of degradation of the lithium-ion battery,
wherein the degree of degradation is defined as an increase in internal resistance within the lithium-ion battery over time that results in a reduction in charge storage capacity of the lithium-ion battery when measured by charging the lithium-ion battery at a same charging voltage for a same length of time.

9. The lithium-ion battery controlling apparatus according to claim 1, wherein the upper-limit voltage is a maximum voltage applied to the lithium-ion battery during charging of the lithium-ion battery.

10. The electric vehicle according to claim 8, wherein the upper-limit voltage is a maximum voltage applied to the lithium-ion battery during charging of the lithium-ion battery.

* * * * *